(12) United States Patent
Sadler

(10) Patent No.: US 9,126,351 B2
(45) Date of Patent: Sep. 8, 2015

(54) SLAB PRODUCTION AND PROCESSING

(75) Inventor: William Alexander James Sadler, Victoria (AU)

(73) Assignee: Abbey and Pride IP Pty Ltd., Victoria (AU)

( * ) Notice: Subject to any disclaimer, the term of this patent is extended or adjusted under 35 U.S.C. 154(b) by 418 days.

(21) Appl. No.: 13/379,265

(22) PCT Filed: Jul. 13, 2010

(86) PCT No.: PCT/AU2010/000890
§ 371 (c)(1),
(2), (4) Date: Mar. 16, 2012

(87) PCT Pub. No.: WO2011/006195
PCT Pub. Date: Jan. 20, 2011

(65) Prior Publication Data
US 2012/0168991 A1 Jul. 5, 2012

(30) Foreign Application Priority Data

Jul. 14, 2009 (AU) .................................. 2009903276
Mar. 4, 2010 (AU) .................................. 2010900914
Apr. 1, 2010 (AU) .................................. 2010901414

(51) Int. Cl.
| | |
|---|---|
| *B28D 1/02* | (2006.01) |
| *B28B 7/34* | (2006.01) |
| *B01F 7/00* | (2006.01) |
| *B01F 7/16* | (2006.01) |
| *B28B 11/12* | (2006.01) |
| *C04B 28/02* | (2006.01) |
| *C04B 40/02* | (2006.01) |

(52) U.S. Cl.
CPC ............. *B28B 7/342* (2013.01); *B01F 7/00283* (2013.01); *B01F 7/1605* (2013.01); *B28B 11/12* (2013.01); *C04B 28/02* (2013.01); *C04B 40/02* (2013.01)

(58) Field of Classification Search
CPC ............ B26D 5/00; B26D 3/00; B26D 5/005; B28B 11/12; B28B 11/14
USPC .................................................. 264/138, 162
See application file for complete search history.

(56) References Cited

U.S. PATENT DOCUMENTS

| | | | | |
|---|---|---|---|---|
| 3,225,412 | A | | 12/1965 | Widell et al. |
| 4,183,987 | A | * | 1/1980 | Eby et al. ....................... 428/192 |
| 4,409,659 | A | | 10/1983 | Devine |
| 5,344,515 | A | * | 9/1994 | Chenock, Jr. .................. 156/171 |

(Continued)

FOREIGN PATENT DOCUMENTS

| | | |
|---|---|---|
| DE | 3929276 A1 | 3/1991 |
| DE | 4321744 A1 | 1/1995 |

(Continued)

OTHER PUBLICATIONS

International Search Report for PCT/AU2010/000890 mailed Sep. 9, 2010.

(Continued)

*Primary Examiner* — Galen Hauth
(74) *Attorney, Agent, or Firm* — Moore & Van Allen PLLC; W. Kevin Ransom

(57) ABSTRACT

A method for cutting a slab of material including cutting the slab with a cutting tool vibrating at a preselected frequency when the material is in a semi-set state.

13 Claims, 4 Drawing Sheets

(56) References Cited

U.S. PATENT DOCUMENTS

| | | | |
|---|---|---|---|
| 2006/0260451 A1* | 11/2006 | Capodieci | 83/34 |
| 2007/0142505 A1 | 6/2007 | Ueta et al. | |
| 2008/0128942 A1 | 6/2008 | High | |
| 2008/0146700 A1 | 6/2008 | Kraus et al. | |

FOREIGN PATENT DOCUMENTS

| | | |
|---|---|---|
| DE | 29613403 U1 | 12/1997 |
| DE | 19633231 A1 | 2/1998 |
| EP | 0351223 A1 | 1/1990 |
| GB | 1043619 A | 9/1966 |
| GB | 1550369 A | 8/1976 |
| GB | 1550369 | 8/1979 |
| GB | 2178686 A | 2/1987 |
| JP | S53131883 U | 10/1978 |
| JP | H01141005 A | 6/1989 |
| JP | H0529795 A | 2/1993 |
| JP | H05147021 A | 6/1993 |
| JP | H05329795 A | 12/1993 |
| JP | 2002347018 A | 12/2002 |
| JP | 2003291121 A | 10/2003 |
| JP | 2007234457 A | 9/2007 |
| SU | 1150083 A1 | 4/1985 |
| WO | WO 2005/078029 A1 | 8/2005 |

OTHER PUBLICATIONS

Written Opinion of the International Searching Authority for PCT/AU2010/000890 mailed Sep. 9, 2010.
First Examination Report for AU2010273169 dated Nov. 30, 2011.
Second Examination Report for AU2010273169 dated Dec. 20, 2012.
Colombia Office Action No. 7872 for PCT Patent Application No. 21969CO2 dated Aug. 5, 2014.
English Translation of First Office Action for Chinese Application No. 201080068059.4.
Supplementary European Search Report for Application No. EP10799278 dated Dec. 13, 2013.
Japanese Office Action for Application No. 2013518906 dated Apr. 15, 2014.
New Zealand First Examination Report for Application No. GB1550369 dated Aug. 15, 1976.
Singapore Written Opinion on Patent Application No. 2013001144 dated Jul. 10, 2014.
Phillippines Examination Report for Patent Application 2013/500085 dated Oct. 20, 2014.
Eurasia First Office Action with English Translation issued for Patent Application No. 2013/90097 dated Jan. 16, 2015.
New Zealand Second Examination Report for Patent Application No. 607210 dated Jan. 30, 2015.

* cited by examiner

SLAB PRODUCTION AND PROCESSING

FIELD OF THE INVENTION

The present invention relates generally to slab products and methods of manufacturing same.

BACKGROUND AND PRIOR ART

Presently, the process of manufacturing cementitious products such as tiles in small individual moulds remains substantially the same as production methods that have been employed for the past 50 years and is still popular throughout the world.

However, over the past twenty years, the production of tiles has developed resulting in tiles with a greater contemporary appearance in response to the fashion and trends of modern architecture and interior design.

Presently, commercially available cementitious slab products are produced from a mix which typically comprises cement, silica sand, large (or coarse) aggregate pieces, a water reducing admixture and water. The large aggregate pieces are included to make up mass and may vary in size from approximately 3 mm to 10 mm or larger. Stone chips are often used as large aggregate pieces. The water reducing admixture may be a plasticizer based on Polycarboxylatic Ether Polymer.

The strength of material used in tile production has increased in relatively recent times, allowing tiles to be produced from a single large and thin slab, similar to marble or granite slabs, which can be cut to produce square or rectangular tiles of a desired size.

Large slabs are formed in individual moulds which are then subject to a vibration process. This causes the finest particles to move to the bottom of the mould. A slab takes the form or shape of the surface of the mould. This is known as "off-form" material.

Such production methods have allowed for greater flexibility in variation of sizes and thicknesses of square and/or rectangular tiles. Cutting tiles from a single slab allows for the production of square and/or rectangular tiles of differing sizes, which would previously have been produced in small individual moulds. Flexibility in production allows tiles to be made to a size at the request of a client without significant re-tooling or maintaining a large number of different mould sizes in stock. Additionally, precision machinery allows for a more accurate and superior finishing for the tiles.

In addition to the abovementioned advantages, cutting a large slab into smaller tiles takes advantage of the inherent natural aesthetic qualities of the large format slab. When separated, the smaller tiles have a unique appearance which increases the visual appeal of large surfaces such as walls and floors when covered with the smaller tiles After the material is mixed it is placed into large moulds where the mix is vibrated into place. For mixes where fluid is added in order to activate the bonding process, the mix is poured into the mould and allowed to cure to a sufficient extent to allow the slab to be removed from the mould. For dry mixes where the bonding process is commenced by subjecting the mix to heat, the mix is poured and pressed into the mould. Dry mixes usually include resins that have a relatively high melting point and once sufficient heat is applied, the resin melts and bonds the remaining materials in the dry mix together. Cooling the material in the mould then sets the liquefied resin and allows the slab to be extracted from the mould.

The moulds are generally stored in a location where the material is allowed to set and harden prior to cutting. The storage period for wet mixed slabs is approximately one to four weeks before the slab is sufficiently cured for cutting of the material.

For naturally cured large slabs, once hardened sufficiently they are de-moulded and stacked for curing. Curing may require up to 4 weeks depending on the method and effectiveness of the curing process.

Of course, the need to allow the slab material sufficient time to cure prior to the cutting process requires the poured slabs to be shifted from the pouring line to a storage area. Generally, the slabs rest on frames after removal from their mould and are packaged for curing. This requires an interruption to the manufacturing process and the provision of sufficient storage space to store the slabs for curing in addition to the manually intensive processes associated with the removal of the slabs from their moulds and placing into storage for curing.

Slabs are calibrated for thickness before being cut into tiles. Following cutting, tiles are "rectified" to produce more accurate sides, the edges of the tiles are chamfered or arrised to erase chipping damage that is usually caused during the cutting process. Individual tiles are then processed including cleaning, drying and packing before being dispatched for sale.

The cutting process and subsequent operations are commonly performed on a continuous automated production line.

As a result, cement or concrete tiles may be ordered and installed in a similar manner to marble, granite and/or porcelain tiles. Further, tiles processed in this manner generally result in a higher quality installation outcome.

However, present production methods of tiles have a number of significant problems.

For example, the processing (cutting, calibrating, arising and/or rectification) of a slab is generally effected by use of diamond cutting tools, such as cutting blades, calibrating tools etc.

When cutting a slab, which is a very hard material, the edges of the cut are subject to varying degrees of chipping and rough edges. Further, the slabs and/or tiles are liable to crack or break during the cutting and calibrating process. The stresses can cause chips and breakages, particularly at corners where the cementitious slab or the tiles are weakest. The chipping, cracking and/or breakages can result in wastage or the need to repair damaged material. This can be both costly and time consuming.

Another disadvantage is that the processing is difficult and requires care by skilled operators in order to ameliorate wastage due to chips, cracks and/or breakages. Such skilled operators are costly and the production of the tiles from the slab is time consuming and interrupts the production process.

Subsequent to the calibrating and cutting process, the slab products are generally stored again to fully cure which may require a further three to four weeks of storage in a controlled environment before dispatching the products to their installation destination. The further storage of slab products for final curing represents additional handling and storage costs.

Other disadvantages in present production techniques include the need for expensive equipment for cutting (including diamond tools and large capital equipment), large energy costs (for example, electricity) and a large amount of water, which is consumed during the processing of slabs into products. It is not unusual for a calibrating apparatus to cost $400,000 or more with a cutting line expected to cost approximately $700,000 to $1 million dollars.

The cutting and calibration processes also result in a large quantity of waste material, which is created when material is removed during the cutting and calibration processes. The waste must then be separated from the water used for the processing prior to re-use of that water. The separated waste material must be collected, treated and disposed of, which may be inconvenient and/or expensive. In this regard, the cost of a water filtration system is expected to be approximately $100,000 to $200,000. Further, the operational cost with respect to electrical energy consumption of all the equipment is generally significant as most of the equipment needs a multi-purpose power supply.

The cutting process can be particularly wasteful when cutting small tiles or mosaic pieces as the diamond cutting blade removes approximately 3mm to 5mm of material from each cut. When producing many tiles from slabs, the total volume of material removed during the cutting process is significant.

As a result of problems with existing processes, it has been considered that producing small tiles, mosaic pieces and tiles with curved or other non-quadrangular shapes is too problematic. In the case of mosaics, present production methods typically result in approximately 50% to 60% wastage of material thereby only generating a 40% to 50% yield. This is primarily due to the substantial amount of material that is wasted as a result of the cutting process producing relatively small tiles combined with the increased incidence of damage inflicted on the tiles. Unfortunately, the relatively small size of the tile leads to an increased incidence of chipping as the tile moves and vibrates as it is separated from the slab as compared with larger tiles that are not as susceptible to movement during separation due to their greater weight.

Furthermore, cutting other types of slab material, such as plasterboard, can be problematic as such materials are generally cut in a hardened state subsequent to manufacture. Typically, preparing a factory for production of slabs and tiles is an expensive undertaking requiring a great deal of planning, preparation, construction and installation time. A factory floor must be specially adapted in order to accommodate heavy purpose built equipment, with each plant requiring drainage systems and effluent tanks for collecting, separating and treating waste material from the water. In addition to all of the abovementioned disadvantages, the construction of a factory with special purpose drainage systems in itself represents a significant cost and hence an impediment to the establishment of a manufacturing facility.

Tiles produced by present processes are not suitable for applications such as creating mosaics, countertops, kitchen islands and/or furniture etc due to the rough edges and/or appearance of the large aggregate pieces at the sides or at the surface of the tiles. Currently, it is preferred to use other materials which are considered less problematic for these applications.

At least one further disadvantage exists with present slab and tile production, being that the products have a high flexural strength. The high flexural strength has the disadvantage that cracks in the tiles do not appear readily and may only become obvious after the product has been fixed in place. This may lead to the requirement for expensive replacement of products such as installed tiles.

Cracks do not readily appear in the product even in circumstances where the product has suffered a solid impact. Such cracks do not readily appear as the interlocking structures of the coarse aggregate pieces tend to hold the material of the product together.

An alternative product to slabs and tiles produced therefrom is natural stone material. However, natural stone material has many variables which are difficult to control. The stone material may be too soft, too hard, too porous or may have too many veins to be useful for a particular purpose. Furthermore, such materials may not be aesthetically appealing for a customer or suitable for a particular application.

It is an object of the present invention to provide a process and product which at least ameliorates one or more of the above-mentioned disadvantages associated with slab and tile production.

The reference to any prior art or prior art techniques, in this specification is not, and should not be taken as, an acknowledgement or any suggestion that these references form part of the common general knowledge of persons skilled in the relevant field of technology of the invention as claimed herein.

SUMMARY OF THE INVENTION

In one aspect, the present invention provides a method for cutting a slab of material including cutting the slab with a cutting tool vibrating at a preselected frequency when the material is in a semi-set state.

In one embodiment, the slab material is cementitious and the constituent materials include cement and other materials with the combined mixture having particle sizes sufficiently small to allow the material to be cut with the vibrating cutting tool. The cementitious material is poured into a mould and then allowed to cure to a semi-set state that, when sufficiently cured, allows the cutting tool to separate the slab into smaller pieces (or remove material from the slab) without the material deforming either during or subsequent to the operation of the cutting tool.

In one embodiment the preselected frequency of the vibrating cutting tool is an ultrasonic frequency. The frequency of vibration may be adjusted or selected to best suit the constituent material of the slab.

In one embodiment, the cutting tool is a straight blade that is mounted on a robotic arm and is manoeuvred under the direction of a control system operating the arm. Whilst the blade will typically be positioned substantially vertically for cutting a slab that is disposed substantially horizontally, it is not necessary for such a geometrical arrangement to exist between the blade and the slab. For example, the slab may be disposed at an angle and further, the blade may be angled with respect to the slab such that it can cut chamfers or create bevelled edges for tiles.

In another embodiment, the cutting tool is a curved blade that can be used to create desired profiles.

The cutting tool is not necessarily limited to a blade and in other embodiments, the cutting tool includes a grating device or a reciprocating cutting tool for removing a fine layer of material.

Profiles may serve a functional purpose or simply provide an aesthetic effect. In this regard, there is an increasing market demand for new and interesting shapes of floor and wall tiles. In response to the demand for innovative products, high resolution digital printing techniques have been used to add complex surface decoration to tiles and the present invention is particularly suited to satisfying the demand for an aesthetic difference to the predominantly available range of square and/or rectangular shaped tiles.

In an embodiment, the slab material is cementitious and the constituent materials do not include large aggregates that would otherwise impede the passage of the cutting tool as it passes through the material, and/or cause tearing or rippling of the material. The cementitious material is poured into a mould and then allowed to cure to a semi-set state that is a state sufficiently cured to allow the cutting tool to separate the slab into smaller pieces (or remove material form the slab) without the state of the material deforming subsequent to the operation of the cutting tool.

In another embodiment, the slab is extruded porcelain. The porcelain slab may be for the purposes of producing monocottura (single fired) tiles or bicottura (twice fired) tiles. In this case, any slab material that is twice fired (or pre-baked), the first firing or baking process that is effected to reduce the moisture content of the slab should not harden the slab material to the extent that it cannot be cut with a vibrating cutting tool.

In a further embodiment of the invention, the slab is a compound stone including polyester resins or polymer acting as a bonding agent for fine siliceous or calcareous aggregate materials with similar physical characteristics as previously outlined. Cutting with an ultrasonic cutting tool such as a straight blade (normally operated by a robotic arm or CNC machine) would occur post pressing and vibrating but prior to the heating/curing of the material. In this regard, the material may be cut with one or more vibrating cutting tools to a size and shape as required. The dry material in its pressed state represents a semi-set state for this particular material and the cutting of the material occurs in this state.

The material is then placed into an oven in which the resin bonding agent is activated and bonds the dry material. Once the baking process is complete, the cooled material is a significantly hard material capable of withstanding substantial impacts.

In another embodiment, the mould includes a sacrificial layer of material to absorb cutting damage that could be imparted by the cutting tool to the mould. The sacrificial layer of material (mould lining) may be applied prior to pouring (or pressing) the material into the mould and may be removed subsequent to the cutting process when de-moulding occurs. The mould lining reduces wear on the mould surface, reduces daily cleaning and/or maintenance requirements and therefore should reduce wastage and/or costs and/or improve the quality of the slab products.

In another embodiment the material includes gypsum. In this embodiment, the slab may further include linerboard. The linerboard may be cut with the material in a semi-set state to produce a shape and/or size of liner board that is presently not available according to current production methods.

In another aspect, the present invention provides a cutting apparatus including a vibration cutting tool, and a microprocessor operably connected to a memory that stores instructions. The location of the cutting tool being determined by the stored instructions, said micro-processor executing the stored instructions thus directing the control system to pass the vibrating cutting tool through a slab of material in a semi-set state.

In another aspect, the present invention provides an article of manufacture including a computer readable medium having instructions stored thereon that control a cutting apparatus according to the present invention.

In another aspect, the present invention provides a slab product according to a method of the present invention.

It will be recognised that the term "cure" is interchangeable with the term "set". It will also be recognized that the term "semi-set" has a substantially similar meaning to "semi-plastic" or "semi-hardened".

DETAILED DESCRIPTION OF EMBODIMENTS OF THE INVENTION

Figure 1:
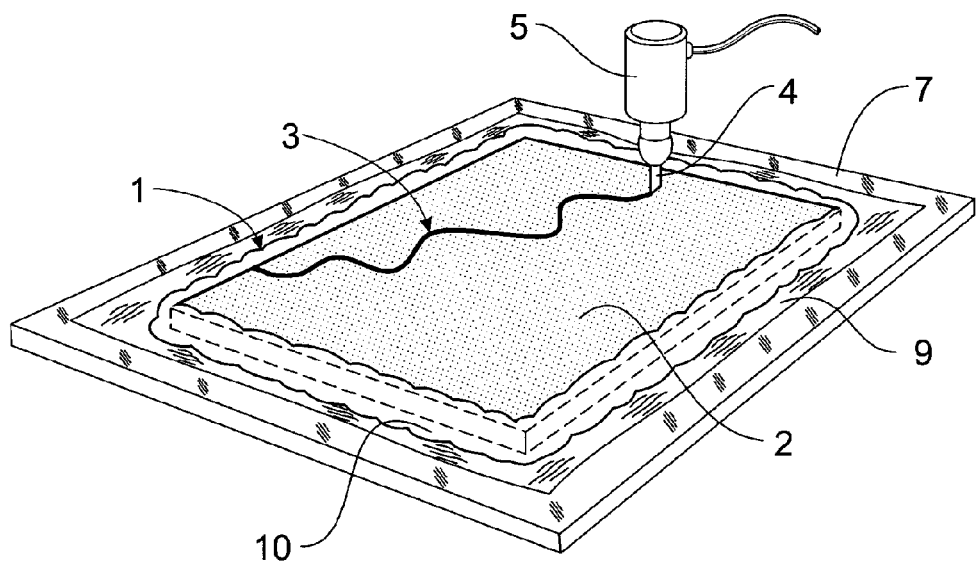
FIG. 1 is a perspective view illustrating an embodiment of a cutting process in accordance with the invention.

It is noted that all of the discussion below, regardless of the particular embodiment being described, is exemplary in nature, rather than limiting.

The present invention is relevant to the manufacture of slabs which may be separated into smaller products such as tiles (internal, external, floor and wall; conventional and alternative type tiles); paving cladding for walls (both internally and externally) mosaics (including floor mosaics); kitchen bench tops; kitchen counters, benches and islands; table tops; integrally cast products for tilt-up panels including scott systems; curtain walling and external cladding with optional accessories, including products containing fibre; insulation tiles; other slab products for the slab market; furniture; roof tiles or slab and/or tiles for other suitable applications.

An example method for producing a slab including cementitious material includes the steps of mixing cement, a fine aggregate material, an ultra fine aggregate material and water. The fine aggregate material and/or the ultra fine aggregate material may be a siliceous material, including sand. Further, the cementitious mix may also include a crushed aggregate material and/or flour, wherein the crushed aggregate material may also be sand.

In order to reduce water content of the cementitious mix, a water reducing plasticizer may be added, which may be a polycarboxylatic ether polymer. The amount of water reducing plasticizer may be between approximately 1% to 5% of the mix by weight of cement. For example, should the cement content of the cementitious mix be 100 kilograms, the amount of water reducing plasticizer may be between approximately 1 kilogram and 5 kilograms. The water to cement ratio, where a water reducing plasticizer is used, may be approximately 0.26.

The ratio of cement to fine aggregate material to ultra fine aggregate material may be 2:2:1. For example, the cementitious mix may contain 100 kilograms of cement, 100 kilograms of fine aggregate material and 50 kilograms of ultra fine aggregate material. Furthermore, in an embodiment where the cementitious mix includes either crushed aggregate material or flour, the ratio of cement to fine aggregate material to ultra fine aggregate material to crushed sand or flour may be 10:10:5:2. For example, the cementitious mix may contain 100 kilograms of cement, 100 kilograms of fine aggregate material, 50 kilograms of ultra fine aggregate material and 20 kilograms of crushed aggregate material or flour.

Of course, the precise ratios of materials in any mix that will produce the best result will depend upon the quality and suitability of the materials, the quality of the polycarboxylate admixture and the efficiency of the mixing apparatus.

In a further embodiment, the cementitious mix may include vinegar and/or ethanol(buffer solution), which is included in order to reduce air content of the cementitious mix. The air content of the cementitious mix may be in the form of air bubbles and it is intended for the vinegar and/or ethanol to reduce the air bubble content of the cementitious mix. The vinegar and/or alcohol to cement ratio may be approximately 0.075.

The material is mixed into a wet consistency. The period of mixing may be approximately 3 to 5 minutes.

Following mixing of the cementitious mix, the material is then placed in a mould for producing a cementitious slab. Moulds may be of varying shapes and sizes and may be made from various materials including aluminium, steel, timber, plastic and/or acrylic. In one embodiment, the mould is made of glass.

As the cutting equipment may damage the surface of a mould, a sacrificial layer of material (or mould liner) may be used with the mould to prevent, or at least reduce damage to the mould. The mould liner may be discarded and replaced after the de-moulding process, and may be formed from plastic, waxed paper or any material suitable for preventing damage to the mould surface that could otherwise occur when a cutting tool is used to cut the slab.

In addition to preventing damage to the mould by the cutting tool, the mould liner also protects the mould surface from the material that is poured in to the mould. In this regard, the mould liner avoids the requirement to clean the surface of the mould after slab products are de-moulded. Obviating the need to clean the mould surface avoids the time and cost that would otherwise be incurred for this task. Also, avoiding damage and any deposit of material on the mould surface ensures consistency in the appearance of slab products manufactured from the mould.

When in the mould, the cementitious mix is allowed to self-level. Self-levelling may take approximately 2 minutes to 6 minutes in duration as air and air bubbles escape from the cementitious mix. Approximately 80% to 95% of air is expected to escape from the mix during the self-levelling process without intervention.

A further reduction in air and air bubbles may be achieved by gently vibrating the mould containing the cementitious mix. A cementitious mix may be vibrated until air and air bubbles substantially no longer appear to be coming to the surface of the cementitious mix. In this regard, the gentle vibration may be of approximately 3 to 10 seconds duration. In any event, the extent to which the mixture requires vibration is significantly reduced as compared with prior methods of producing a slab of cementitious material. Reducing the extent to which vibration is required substantially reduces a significant variable in the production process. Of course, reduction of any variable in a production process has the effect of improving the quality and reproducibility of products from the process.

Following levelling and vibrating of the cementitious mix, it is allowed to set until it is in a substantially semi-set (or substantially semi-hardened) state. When in a semi-set state, the cementitious slab may be cut in to tiles or other desired products. In a semi-set state, the cementitious material may be cut with a cutting tool such as a knife or sharp tool vibrated at a preselected frequency.

The preselected frequency may be an ultrasonic frequency, which may be in the range of 20 kHz to 40 kHz. The ultrasonic cutting tool may be a hand held type or may be incorporated into automated machinery, such as computer controlled automated cutting machinery.

Using a blade vibrating at an ultrasonic frequency should result in very little or substantially no cementitious material sticking to the blade when cutting. This should result in the blade not needing to be cleaned and should also result in little or substantially no cementitious material being removed from the slab during the cutting process. Of course, this also assists to ensure that the slab material is neither torn nor rippled, or otherwise deformed, during the cutting process other than providing a smooth separation.

As illustrated in FIG. 1, a cementitious slab (2) may be formed in a mould (1) and can be cut with a cutting tool such as a blade (4), which is fitted to a cutting device (5). The cutting device (5) may be an ultrasonic cutting device.

The blade (4) cuts the cementitious slab (2) in a desired shape. In the exemplary embodiment shown in FIG. 1, the cut (3) has an irregular shape, which is a curved shape. As the slab is cut while in a semi-set state, the cut (3) may be of many different shapes, including curved lines and sharp corners. This is particularly useful in instances where a curved shape is required such as removing a portion from a slab to be used as a kitchen bench top for subsequent fitting of a sink or tap ware.

FIG. 1 also illustrates various other components of the mould including the substrate 7, a layer of material 9 that forms a mould lining and a mould retaining wall 10. The substrate 7 should present a surface to the poured material that is acceptable for an "off-form" mould. In the embodiment of FIG. 1, the substrate 7 is a sheet of glass that presents a very uniform surface to the poured material.

In order to protect the substrate 7 from the cutting tool 4, a mould lining 9 is applied to the surface of the substrate 7. In the embodiment of FIG. 1, the mould lining 9 is applied to the substrate 7 with a tool to ensure that any air between the mould lining 9 and the substrate 7 is substantially removed.

Subsequent to applying the lining 9, the retaining wall 10 is formed. In the embodiment of FIG. 1, the retaining wall 10 is formed from an acrylic material that is malleable and quick drying. Once solidified, the wall 10 remains relatively soft and malleable such that it may be easily removed.

The ultrasonic cutting tool may be a thin blade, which is capable of cutting cementitious material in a semi-set state. Further, cutting of the material may occur at approximately 4 metres to 8 metres or greater per minute.

The cementitious material cures into a substantially semi-set state following self-levelling and/or vibration. This part of the curing process may be approximately 30 minutes to 1 hour in an ambient temperature of approximately 21 degrees Celsius. A higher ambient temperature may accelerate the curing time. It is important to understand that cutting of the cementitious slab may occur at any time after the placement of the cementitious material into a mould, however, the cementitious material should be levelled, air and/or air bubbles allowed to be emitted and/or removed, and the cementitious material sufficiently cured so as to be in a semi-set state.

The cementitious material may be assessed for suitability for cutting by applying the cutter to the cementitious material and observing that when the material is cut it does not deform and/or meld back together over or around the cut.

It will be recognised that, as the cementitious slab is cut whilst in a semi-set state, there is substantially reduced stress on the cementitious material as compared with previous methods of cutting which involves the use of a diamond tipped saw blade cutting the material in a hardened state. As a result of the reduced stress on the cementitious material, chipping and breaking of the cementitious slab should be eliminated or at least substantially reduced. Further, substantially no cementitious material adheres to the cutting tool during the cutting process of the present invention.

The cementitious slab may be cut into tiles having a range of sizes and shapes. The shapes may include curved and rounded shapes and the tiles may also be produced with sharp corners.

Figure 2:
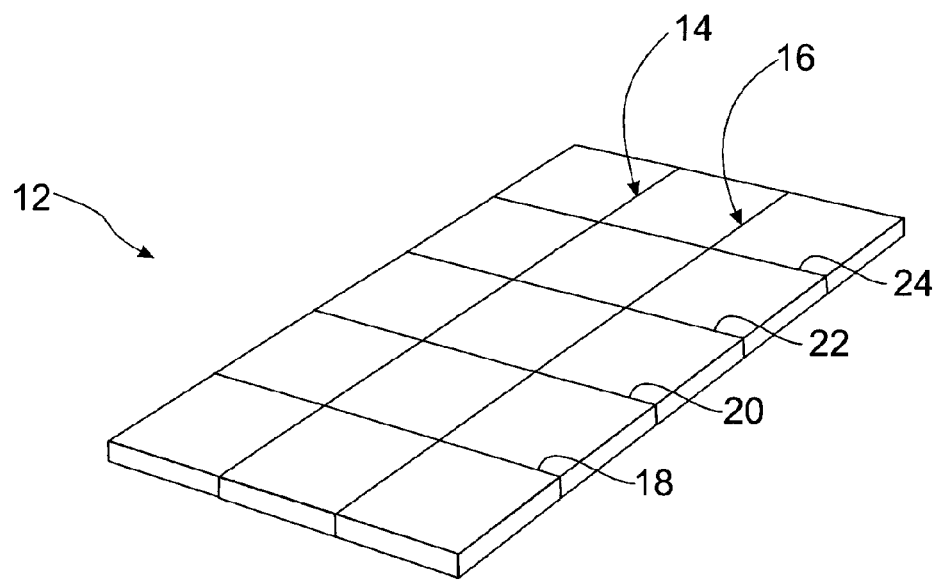
FIG. 2 is a perspective view of a slab of material with an array of straight cuts rendering an array of square or rectangular tiles when de-moulding occurs. In this Figure the mould walls have been omitted for illustration purposes.

With reference to FIG. 2, a slab is illustrated without the retaining walls or the substrate and mould lining. However, FIG. 2 illustrates a slab 12 of material that has been cut with 2 longitudinal straight cuts (14 & 16) and a number of transverse straight cuts (18, 20, 22 & 24) such that the slab 12 has been cut into 15 separate square or rectangular tile products.

Of course, the vibrating cutting tool can be used to cut slab material at angles other than substantially perpendicular to the top surface of the poured slab.

Figure 3:
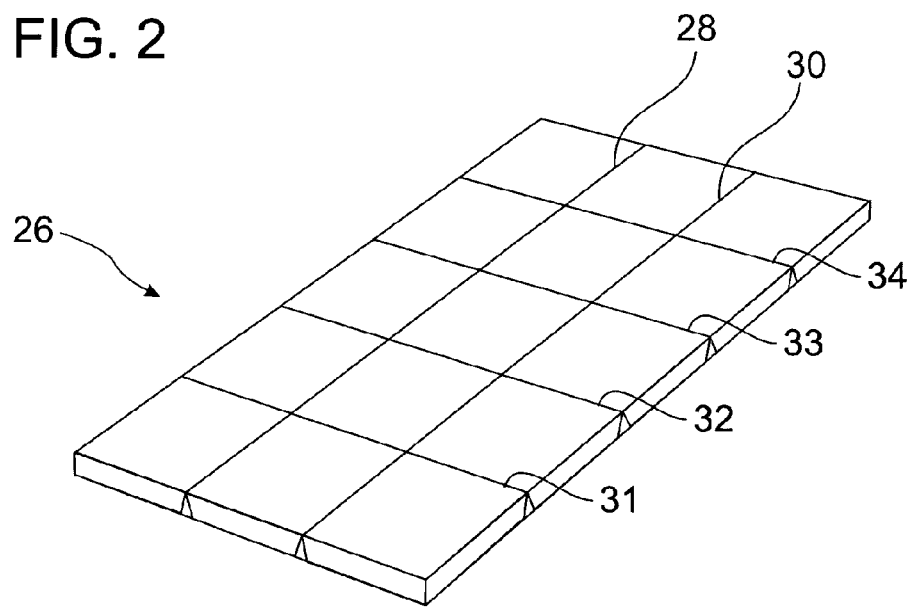
FIG. 3 is a perspective view of a slab of material illustrating angled cuts that have been implemented to render tiles with an inclined side wall that assists individual tiles avoid chipping damage to the top surface or for design purposes.

With reference to FIG. 3, a slab 26 is illustrated once again without the retaining wall, substrate or mould lining. However, FIG. 3 illustrates slab 26 with longitudinal cuts (28, 30) and 4 transverse cuts (31, 32, 33 & 34), with each of the identified longitudinal cuts involving two passes of a vibrating knife blade disposed at an angle as compared with the surface of the slab 26. For example, longitudinal cut 28 actually comprises 2 separate passes of a vibrating knife blade such that an inverted "V" shaped cut is imparted. Individual slab products removed from the mould will have a wall that is inclined as compared with the surface of the individual slab product. As compared with the individual tiles rendered from the slab 12 in FIG. 2, the individual tiles rendered from slab 26 in FIG. 3 will have an inclined edge wall that will have a greater resilience to chipping of the top surface of the tile (bottom surface of the poured slab) as compared with the tiled products rendered from the slab 12 illustrated in FIG. 2.

It will be appreciated by those skilled in the relevant field of technology that cutting a slab in a semi-set state with a vibrating cutting tool affords a significantly greater degree of flexibility as compared with current slab product manufacturing methods. For example, with reference to FIG. 4A, a slab is illustrated depicting various shaped slab products. In this regard, the individual slab products have various shapes including circular, triangular and diamond shapes. Each of these products may be cut from the slab with an inclined wall and in this particular example, the degree of flexibility afforded by the present invention is clearly demonstrated as a single slab may be cut to generate a range of different shaped slab products depending upon the particular manufacturing requirements at any point in time.

Figure 4A:
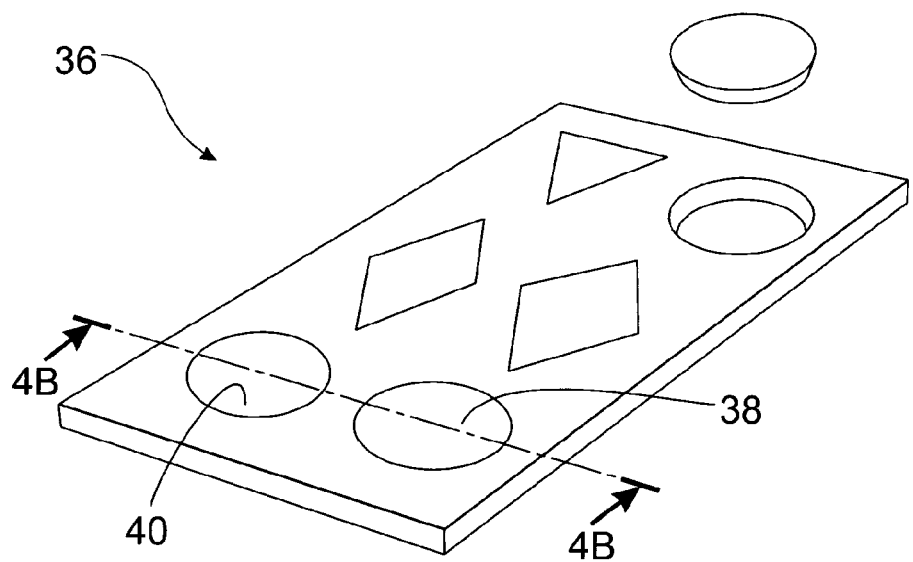
FIG. 4A is a perspective of a slab of material with an array of curved cuts rendering an array of circular tiles.

Further, the slab 36 illustrated in FIG. 4A includes slab products with a shape and configuration that are very difficult to manufacture according to present production methods or at least, extremely difficult to manufacture without a substantial amount of waste. For example, diamond shaped tiles are particularly rare in view of the difficulty associated with cutting a diamond shaped tile from a slab with a diamond tipped saw blade. In this regard, it is very difficult to produce a diamond shaped tile according to present production methods as the physical stress imparted to a tile during the cutting process with a diamond tipped cutting blade generally results in damage in the form of chipping in the region of the diamond shaped tile at the point where the intersection of the walls of the tile define an acute angle.

For this reason, the present approach to manufacturing tiles with curved shapes and/or pointed portions is to use a high pressure jet of water to cut the specific shape desired from a slab. However, this approach has a number of disadvantages that render it commercially infeasible for producing slab products such as tiles. Generally, this approach to producing a tile is only used for a special requirement or a one only design where a premium price is expected.

As can be seen from FIG. 4A, the degree of flexibility available with respect to cutting particular shaped slab products from a slab according to this embodiment of the invention is only limited by the ability to control the position and passage of the vibrating cutting tool. In an embodiment, the vibrating cutting tool is controlled by a robotic arm or a CNC machine and for any particular production requirement it is only necessary to select the appropriate control program that defines the shape and/or configuration of slab products to be cut from the slab.

A control system determines the path of the cutting tool through the slab and may also control the selection of the specific cutting tool for any particular region of the slab. The control system includes a micro-processor and a memory device for storing instruction code that controls the robotic arm. The instruction code may be tangibly embodied in information carriers, such as a CD-ROM, a DVD-ROM, a semiconductor memory, or a hard disk. Such computer program products may cause a data processing apparatus to conduct one or more operations described in this specification. The memory may encode one or more programs that cause the processor to perform one or more of the method acts described in this specification. Further the subject matter described in this specification can be implemented using various machines.

Selected aspects, features and components of the implementations described above are depicted as stored in memories. However, all or part of the apparatus and/or systems, including logic (such as computer executable instructions) for implementing the methods, may be stored on, distributed across, or read from a wide variety of machine or computer-readable media. The media may include storage devices such as hard disks, flash memory, floppy disks, or developed in the future. The logic may also be encoded in a transitory or non-transitory signal tht encodes the logic as the signal propagates from a source to a destination.

The logic that implements the apparatus and/or systems may include any combination of hardware and software, which may vary widely in implementation. For example, a processor may be implemented as a microprocessor, or microcontroller, a DSP, an application specific integrated circuit (ASIC), discrete logic, or a combination of other types of circuits or logic. Similarly, memories may be DRAM, SRAM, Flash or any other type of memory. The functionality of apparatus and/or system may be distributed among multiple computer systems. Parameters, databases, and other data structures may be separately stored and managed, may be incorporated into a single memory or database, or may be logically and physically organized in many different ways. Any of the logic described may be implemented with programs that are parts of a single program, as separate programs, or distributed across several memories and processors. The logic may be organized into software libraries, including dynamic link libraries (DLLs), application programming interfaces (APIs), or other libraries.

Figure 4B:
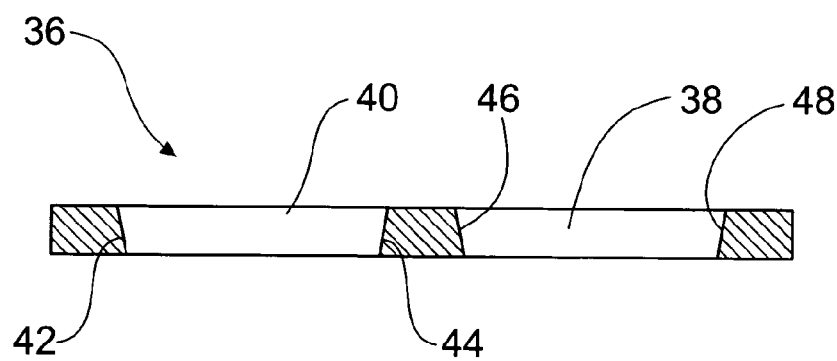
FIG. 4B is a cross-sectional view of the slab of FIG. 4 along the plane 4B-4B detailing the angled cuts that render the circular tiles with an inclined wall.

Each of the slab products defined in the slab 36 of FIG. 4A has an inclined wall and this is further illustrated in FIG. 4B which is a plan view of the cross-section through a plane defined by the line 4B-4B and extending through the slab 36 at right angles to the top surface of the slab.

With reference to FIG. 4B, the slab 36 has two circular tiles (38, 40) that have been cut from the slab 36. In addition to imparting circular cuts to the slab 36 to define circular tiles 38 and 40, the vibrating cutting blade was disposed at an angle as compared with the top surface of the slab 36 in order to cut circular tiles 38 and 40 from the slab 36 with inclined walls. The inclined walls with each of the circular tiles 38 and 40 are illustrated in FIG. 4B as cuts 42, 44, 46 and 48.

In addition to cutting different shaped tile products from a slab with a significant degree of flexibility, the present invention also enables slab products to be generated with a range of profiles in addition to the inclined walls illustrated in FIGS. 3, 4A and 4B. In this regard, with reference to FIGS. 5A to 5F, a range of slab product profiles are illustrated.

Figure 5A:
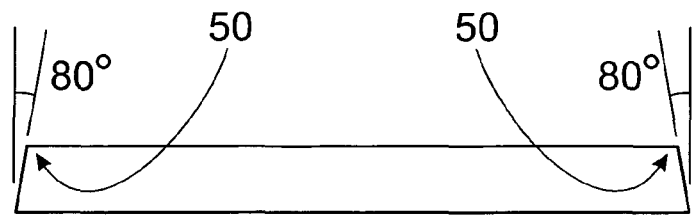
FIGS. 5A to 5F are diagrammatic representations of cross sections of a range of slab products illustrating possible profiles that can be rendered with a vibrating cutting tool according to embodiments of the present invention.

In FIG. 5A, a slab product with inclined walls such as would be de-moulded from the slab illustrated in FIG. 3 is illustrated with inclined walls at approximately 80 degrees from the horizontal. As previously indicated, generating a tile with an inclined wall results in a tile with an increased resilience to chipping damage to the tile at the point of intersection between the wall and the top surface (50). However, the present invention provides a significant degree of flexibility with respect to the production of tiles or slab products with a desired profile.

Figure 5B:
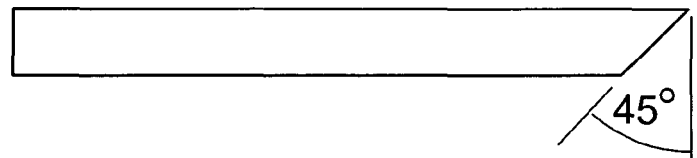

For example, FIG. 5B illustrates a slab product with one end having a wall inclined at approximately 45 degrees from the vertical. This type of profile is particularly useful for wall tiles that are used to clad a corner of a wall with the mitre cut edge enabling two wall tiles with a similar profile to be abutted together at the corner of the wall thereby forming a relatively continuous tiled appearance around the corner of the wall.

Additionally, the profile illustrated in FIG. 5B may be useful when manufacturing the tread of a set of stairs where the mitre cut edge would be used to abut with a similar profile of another slab product that would form the risers of the set of stairs.

Figure 5C:
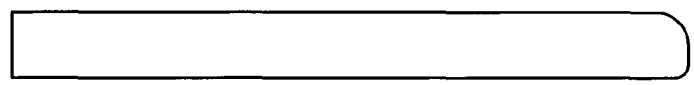

In this regard, it is also possible with the present invention to generate a profile as illustrated in FIG. 5C that could also be used for the tread of a set of stairs where the profile is generally referred to as a "Bull Nose" which presents a rounded profile and reduces the safety risk to users of stairs in the event that a user were to fall and impact upon the rounded surface of the stair tread. Of course, in generating a profile as illustrated in FIG. 5C it would be preferable to use a vibrating cutting device in the form of a rounded or curved vibrating knife blade. Further, in generating a profile such as illustrated in FIG. 5C it may be necessary for the vibrating cutting tool to make numerous passes back and forth along the edge of the slab product in order to generate the desire to profile with successive passes removing relatively smaller amounts of slab material.

Figure 5D:
Figure 5E:
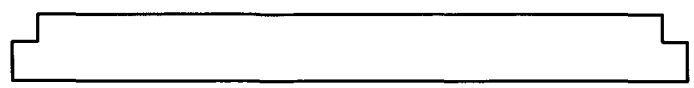

With reference to FIG. 5D, the profile of a tile with chamfered edges is illustrated. Further, FIG. 5E illustrates a tile with a stepped edge which may be useful and/or generate a desired aesthetic effect. In the instance of a profile illustrated in FIG. 5E it may be necessary for the vibrating cutting tool to make numerous passes back and forth along the edge of the slab product and further, it may be necessary when generating such an edge profile to remove slab material either during or subsequent to the cutting process in order to provide sufficient available space for the vibrating cutting tool to effect the additional required cutting of the slab material to generate the desired profile.

Figure 5F:
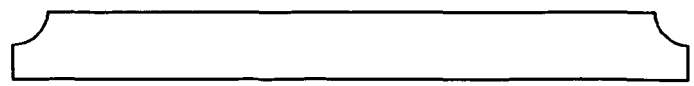

With reference to FIG. 5F, a further slab product profile is illustrated and in this particular instance the vibrating cutting tool may take the form of a cylindrical or semi-cylindrical device with a sharp edge extending along the periphery of the cylindrical or semi-cylindrical device.

For any or all of the profiles illustrated in FIGS. 5A to 5F it may be preferable to generate a mould that is approximately the desired width such that the illustrated profiles may be generated by imparting cuts to the slab product at the respective edges of the slab product. This is particularly the case for the profiles illustrated in FIGS. 5C, 5D, 5E and 5F where the profile is required to extend from the top surface of the tile that is formed as the bottom surface of the poured slab. In these instances, once the slab has cured to a semi-set state the vibrating cutting tool can be used to remove the retaining wall formed by the malleable acrylic material to expose the edge of the slab material in order to allow access of a vibrating cutting tool to generate the desired edge profile. In an embodiment of the invention effecting this particular method, at the time of cutting and trimming the mould retaining wall and any excess material to form an edge of a slab product, the material that is desired to be removed may be removed either during or subsequent to the cutting process that separates the unwanted material from the slab. Removal of slab material may be effected by the robotic arm that manoeuvres the cutting device and the cutting tool.

However, in other embodiments of the invention, once a slab is poured and the initial curing process commences, the top surface of the poured slab is worked in order to render the top surface of the poured slab acceptable for presentation as the top surface of the slab product. In this regard, the top surface of the poured slab may be scraped or scoured to render a suitable surface for a slab product. In instances where such surfaces are acceptable as the top surface of the slab product the generation of the profiles illustrated in FIGS. 5B to 5F are somewhat easier to manufacture.

Cutting a cementitious slab whilst in a semi-set state does not require the use of expensive cutting equipment, such as diamond tools, and reduces cutting time. Also, the amount of water required for cutting is substantially reduced or may be eliminated altogether. This has a further advantage in that little or no effluence is produced, which previously required expensive treatment and/or disposal.

Cutting a cementitious slab whilst in a substantially semi-set state consumes significantly less energy as compared with prior cutting methods. Many of the above-mentioned advantages may also lead to reduced production costs. This is particularly the case for mosaic tiles (i.e. tiles of relatively small dimensions). Presently, the wastage that occurs when cutting mosaic tiles from a slab using a diamond tipped saw blade is substantial. Accordingly, mosaic tiles attract a premium price as the extent of wastage during production using presently accepted methods can be as high as 50% to 60% due to damage during production and the material removed by the saw blade. With average yields of 40% to 50% for mosaic tile production, a significant price premium is associated with mosaic tiles and hence, they are rarely used in building construction.

Of course, the production of mosaic tiles using the system and methods of the present invention will result in significantly higher yields with virtually no waste (or at least substantially less waste) as compared with cutting mosaic tiles from a slab with a diamond tipped saw blade.

The cementitious slab may be poured to create slab products of thicknesses of between approximately 3 mm to 6 mm. This may create possibilities for new and innovative products.

Furthermore, as a result of there being less stress caused to the product during processing, the material may be substantially stronger. In turn, this may result in fewer problems, such as broken corners etc, during installation of the product.

Moreover, as no large aggregate pieces are used in producing the cementitious material, there may be a reduction in post-installation problems associated with the slow development of cracks (including hair-line cracks).

The fine and/or ultra fine materials may include limestone, granite or marble. A cementitious mix may include a combination of any or all of these materials or other siliceous materials.

The cementitious slab may also be assessed and/or calibrated for consistency of thickness. Any areas of the cementitious slab which are thicker (higher) than desired may be removed. Removal may be effected by a cheese grater type device acting as the cutting tool. However, it will be recognised that any requirement for assessing and/or calibrating the thickness of the cementitious slab and/or removing material from thicker areas of the slab should be substantially minimised or eliminated due to the method of production of the slab according to the present invention.

Assessing and/or calibrating the thickness and/or removing cementitious material in order to achieve an even thickness may occur before or after the slab is cut into tiles. However, assessing and/or removing cementitious material occurs whilst the cementitious slab is in a semi-hardened (semi-set) state thereby reducing the stress to which the product is subjected as compared with a hardened product.

Following cutting of the cementitious slab, the tiles are stored for approximately 20 to 24 hours, which allows for further hardening of the products such as tiles. The tiles are hardened such that they may be removed from the mould.

In an alternative embodiment, the invention may be used to produce plasterboard. In this embodiment, the plasterboard may be produced in a mould, wherein a first side of the plasterboard linerboard is placed in the mould, the plaster material (including gypsum) is poured into the mould on top of the first linerboard, then a second side of the plasterboard linerboard is placed on the plaster material, thus forming a "sandwich" of linerboard with plaster material there between.

The plasterboard is then cut with a blade vibrating at a pre-selected frequency whilst the plaster material is in a semi-set state. The blade also cuts through the first and second side of linerboard.

In this way it may be possible to form plasterboard into a range of shapes which would be substantially more difficult to form if the plasterboard were to be cut when the plaster material is fully, or substantially fully set.

The present invention embodies various advantages and in particular, enables the efficient and less costly manufacture of slab products as compared with existing processes. For example, the cutting of slab material in a semi-set state avoids the need to allow the slab to harden to a sufficient extent to withstand the stress and impact of cutting the slab with a diamond tipped blade. This has the combined advantages of avoiding the requirement to interrupt the processing of the slab between pouring and cutting and obviates the need for expensive mixing and calibrating/cutting equipment that is normally used in present day manufacturing processes.

Further, by reducing, or virtually eliminating, the amount of material removed from the slab during the cutting process, the manufacturing process avoids any need to use water to capture and carry the excess material away from the cutting surface. This avoids any requirement for a water filtration plant and the on-going maintenance that is usually required for such a system.

Obviating the need for large and heavy equipment, or the need for water drainage and treatment systems, avoids the need to manufacture slab products in a purpose built facility. In contrast, manufacturing slab products in accordance with the present invention may be performed in any facility capable of housing the necessary equipment to effect cutting of slab material in a semi-set state. In this regard, the electrical power consumption to operate such equipment is substantially less than present requirements. Further, by enabling the cutting process to be effected shortly after the pouring process avoids the manually intensive handling associated with interim storage of slabs for curing and also avoids the need to store slabs until such time as they may be cut.

It will be understood by a person skilled in the technology that the above-described methods may be applied when producing slabs of material other than cementitious slabs or plasterboard.

While certain exemplary embodiments have been described, it is to be understood that such embodiments are merely illustrative of and not restrictive on the invention, and that this invention is not limited to the specific constructions and arrangements described since various other changes, combinations, omissions, modifications and substitutions, in addition to those set forth in the above paragraphs, are possible. Those skilled in the art will appreciate that various adaptations and modifications of the described embodiments can be configured without departing from the scope and spirit of the invention. Therefore, it is to be understood that, within the scope of the appended claims, the invention may be practiced other than as specifically described herein.

The invention claimed is:

1. A method for cutting a slab of material including placing material that forms the slab into a mould and cutting the slab material with a cutting tool vibrating at a preselected frequency when the material is in a semi-set state, wherein the cutting tool is a blade that is maneuvered on a path along the slab and cuts the material and the mould such that the material is cut to at least its full depth.

2. A method according to claim 1 wherein the slab material is cementitious and a constituent materials include cement with other materials where a combined mixture has particle sizes sufficiently small to allow the slab material to be cut with the vibrating cutting tool.

3. A method according to claim 2 wherein the cementitious material is poured into a mould and subsequently allowed to cure to a semi-set state being a state that is sufficiently cured to allow the cutting tool to separate the slab without the material deforming either during or subsequent to the operation of the cutting tool.

4. A method according to claim 1 wherein the slab material is non-cementitious and the constituent materials subsequent to mixing are relatively dry, the mixture is pressed into a mould and heated to render the material to a semi-set state prior to cutting the slab.

5. A method according to claim 1 wherein the slab material is gypsum and wherein the gypsum slab material is lined with a cellulous material both of which are cut with the cutting tool while the gypsum material is in a semi-set state.

6. A method according to claim 1 wherein the pre-selected frequency of the vibrating cutting tool is an ultrasonic frequency.

7. A method according to claim 1 the cutting tool is a curved blade.

8. A method according to claim 1 wherein the cutting tool is maneuvered under the direction of a control system including a micro-processor and a memory for storing instructions such that the position and movement of the cutting tool is determined by the stored instructions executed by the microprocessor.

9. A method according to claim 1 wherein the slab material in a semi-set state is disposed substantially horizontally and the cutting tool is a straight blade that is maneuvered under the direction of a control system such that the vibrating blade passes through the slab material cutting same at desired locations.

10. A method according to claim 8 wherein the blade is disposed at an angle other than perpendicular to the surface of the slab of material thus allowing portions of the slab to be separated with an angled cut.

11. A method according to claim 1 wherein the blade is selected from a plurality of cutting tools.

12. A method according to claim 1 wherein cutting the slab of material includes removing a fine layer of material from any one or more of the surfaces of the slab of material.

13. A method according to claim 1 wherein the slab material is cementitious and the mould is formed from a substrate with a malleable material applied thereto thus forming mould walls to retain poured slab material within the mould, said malleable material capable of separation by the vibrating cutting tool during the cutting of the slab material in a semi-set state.

* * * * *